2,791,676
LIGHT-CONTAINING HANDLE FOR FISHING EQUIPMENT

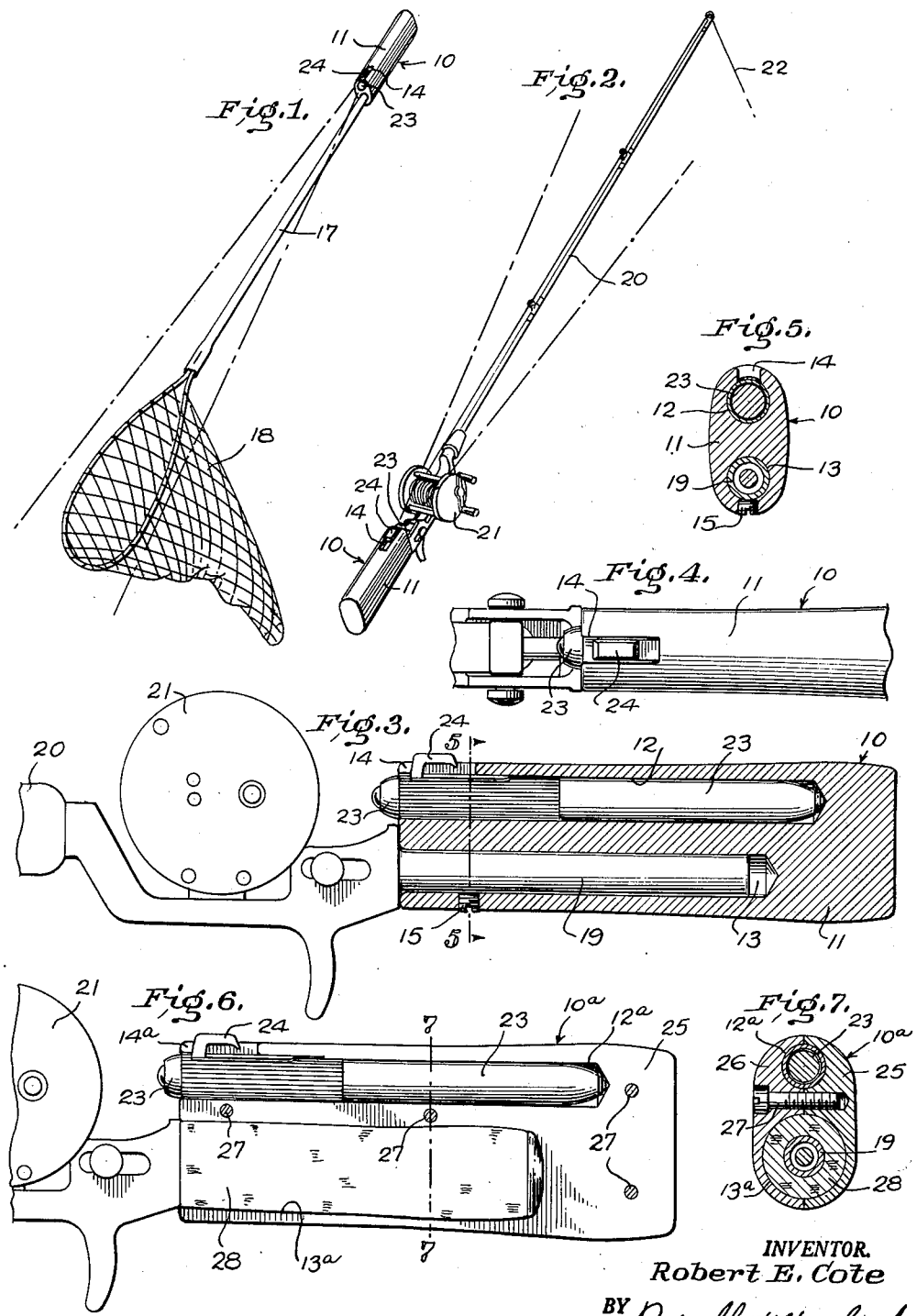
May 7, 1957 — R. E. COTE — 2,791,676
LIGHT-CONTAINING HANDLE FOR FISHING EQUIPMENT
Filed Jan. 5, 1954
INVENTOR.
Robert E. Cote
BY Reginald W. Hoagland
ATTORNEY

United States Patent Office 2,791,676
Patented May 7, 1957

Robert E. Cote, Flint, Mich.

Application January 5, 1954, Serial No. 402,306

2 Claims. (Cl. 240—6.4)

The present invention relates to a light-containing handle for fishing equipment, and is consists in the combinations, constructions, and arrangements of parts herein described and claimed.

Generally, the invention pertains to a handle for use on different types of fishing devices and of a construction that houses a flashlight with the switch of such flashlight easily accessible to and operable by the thumb of the user of the device engaged around the handle. The invention consists of a handle having a pair of parallel bores extending longitudinally therein from one end thereof. One of the bores is adapted to have frictionally or otherwise mounted therein a flashlight of the "pencil" type, while the other of the two bores is adapted to receive therein one end of the fishing device itself. The handle is such that it provides a flashlight conveniently mounted so that it may be utilized simultaneously with the fishing device to which it is attached.

It is accordingly an object of the invention to provide a novel light-containing handle for fishing equipment.

Another object of the invention is to provide a device of the character set forth which is simple in construction, inexpensive to manufacture, and yet effective and efficient in use.

Still another object of the invention is to provide, in a device of the character set forth, novel means for providing access to the switch operating button or knob of a flashlight mounted therein.

Other and further objects of the invention will become apparent from a reading of the following specification taken in conjunction with the drawing, in which:

Figure 1 is a perspective view of an embodiment of the invention shown mounted upon a fishing net;

Figure 2 is a view similar to Figure 1, but showing the device mounted upon a fishing rod;

Figure 3 is an enlarged fragmentary vertical longitudinal sectional view of the device shown in Figure 2;

Figure 4 is a fragmentary plan view of Figure 3;

Figure 5 is a sectional view taken along line 5—5 of Figure 3;

Figure 6 is a view similar to Figure 3, but showing a modified form the device may assume; and Figure 7 is a sectional view taken along line 7—7 of Figure 6.

Referring more particularly to the drawings, there is shown in Figures 1 through 5, one embodiment of the invention wherein a handle is generally indicated at 10 and comprising an elongated body 11 which is substantially oval in cross section and which has extending into its forward end an upper bore 12 and a lower bore 13. The spaced apart bores 12 and 13 are illustrated as being substantially parallel, but may be slightly angled relative to one another for a purpose to be set forth as the description proceeds. Also extending into the forward end of the body 11, but for a much shorter length than said bores, is a narrow slot 14 that opens into the upper bore 12 and exterior of the handle 10. Adjacent the forward end of the handle and extending between the lower bore 13 and the lower exterior surface of said handle is a threaded opening into which is received a set screw 15.

The handle 10 may be mounted upon a handle shaft 17 of a fishing net 18 or upon the handle shaft 19 of a fishing rod 20 equipped with the conventional reel 21 and line 22 by receiving in the bore 13 the free end of the shaft 17 or the handle shaft 19, as illustrated in Figure 3, whereupon the same may be locked therein by means of the set screw 15. Within the bore 12, there is frictionally mounted or otherwise secured a flashlight 23, preferably of the "pencil" type, which flashlight is provided with a switch operating knob 24 which projects outwardly through the slot 14.

It will be apparent when the handle 10 is so mounted upon the fishing device as above set forth, that light projected from the flashlight will play upon those portions of the fishing devices which it is important for the fisherman to observe, such as, for example, the net 18 in the one case, and the reel 21 and line 22 in the other case. Because of this, it may be necessary that the relationship of the bores 12 and 13 be other than parallel. The housing of the flashlight 23 in the handle 10 naturally requires the handle to be of a cross sectional area greater than that of customary handles, but this is not objectionable because arranging the flashlight in the upper portion of the handle for positioning said flashlight for effective use also provides an arrangement that lends itself to use of a handle that is oval in cross section, thus eliminating to a great extent the tendency of the handle turning in the user's hand.

In Figures 6 and 7, there is shown a modified form of the invention wherein a handle, generally designated as 10ª, comprises two longitudinally divided complementary parts 25 and 26 which are interconnected by transversely extending screws 27. The parts 25 and 26 are each provided with longitudinally extending recesses which together form cylindrical bores 12ª and 13ª, and are also provided with notches which together form a slot 14ª similar to the slot 14.

In this form of the invention, the conventional handle covering 28 on the handle shaft remains intact, and the handle 10ª is clamped over the handle covering 28 by means of the screws 27, the operation of the remainder of the device being identical with that above described.

While I have herein described specific forms which the invention may take, it will be understood that changes and modifications may be made by those skilled in the art which still fall within the spirit and scope of the appended claims.

What is claimed is:

1. An attachment to the handle shaft of a piece of fishing equipment and to the casing of an ordinary self-contained pencil-type flashlight whereby said attachment provides a handle for the piece of fishing equipment and a support for the flashlight, said attachment comprising an elongated body having an exterior hand gripping surface thereon which is substantially oval in cross section throughout its length and having an upper bore and a lower bore extending longitudinally therein and throughout the major portion of its length from one of its ends, said bores being in substantially parallel relation to one another, said upper bore being of a size and shape to receive the major portion of the self-contained flashlight and to frictionally embrace the outer casing thereof for mounting the flashlight in the body, said lower bore being of a size and shape to receive the handle shaft of the piece of fishing equipment, and means for locking the attachment to the handle shaft of the piece of fishing equipment.

2. An attachment as defined in claim 1 wherein the end of the body into which the bores extend is notched inwardly for a short distance between the upper bore and the oval-shaped exterior surface so as to accommodate a switch-operating knob of said flashlight.

References Cited in the file of this patent

UNITED STATES PATENTS

| | | |
|---|---|---|
| D. 162,319 | La Falce | Mar. 6, 1951 |
| 2,192,791 | Kendall | Mar. 5, 1940 |
| 2,240,596 | White et al. | May 6, 1941 |
| 2,283,816 | Loutrel | May 19, 1942 |
| 2,315,539 | Nelson | Apr. 6, 1943 |
| 2,420,087 | Meek | May 6, 1947 |
| 2,565,633 | Scott | Aug. 28, 1951 |
| 2,643,371 | Sleeger | June 23, 1953 |
| 2,734,124 | Funk | Feb. 7, 1956 |